United States Patent
Takada

(10) Patent No.: US 7,221,293 B2
(45) Date of Patent: May 22, 2007

(54) DATA CONVERSION PROCESSING APPARATUS

(75) Inventor: Shuichi Takada, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/385,784

(22) Filed: Mar. 22, 2006

(65) Prior Publication Data

US 2006/0214938 A1 Sep. 28, 2006

(30) Foreign Application Priority Data

Mar. 23, 2005 (JP) .............................. 2005-083874

(51) Int. Cl.
*H03M 7/00* (2006.01)
(52) U.S. Cl. .......................................... 341/61; 341/50
(58) Field of Classification Search ............. 341/50–90
See application file for complete search history.

(56) References Cited

U.S. PATENT DOCUMENTS

| 5,202,670 | A | | 4/1993 | Oha |
| 5,373,493 | A | | 12/1994 | Iizuka |
| 5,567,901 | A | * | 10/1996 | Gibson et al. ............... 84/603 |
| 5,641,926 | A | * | 6/1997 | Gibson et al. ............... 84/603 |
| 5,825,899 | A | | 10/1998 | Yamaguchi et al. |
| 5,986,198 | A | * | 11/1999 | Gibson et al. ............... 84/603 |
| 6,765,578 | B2 | | 7/2004 | Slavin |

FOREIGN PATENT DOCUMENTS

| JP | 6349972 | 3/1988 |
| JP | 5182362 | 7/1993 |
| JP | 8321745 | 12/1996 |

\* cited by examiner

*Primary Examiner*—Lam T. Mai
(74) *Attorney, Agent, or Firm*—Stevens, Davis, Miller & Mosher, LLP

(57) ABSTRACT

A data conversion processing apparatus provides flexible and multifunctional resampling processing using the general-purpose setting method of direct memory access (DMA) setting. In the data conversion processing apparatus, in response to a CPU setting parameters such as input channel information and output channel information including an address for identifying each channel, the transfer amount, and so forth, for a DMA unit, the DMA unit performs data transfer via an input channel and output channel in accordance with the parameters specified by a CPU. A transfer from a first input section to a resampling section via the DMA unit can be specified, including transfer contents from a memory to a first output section. A transfer from the first input section to the first output section is performed by two DMA transfers.

13 Claims, 11 Drawing Sheets

FIG.10

| LOGICAL CH 101 | INPUT ATTRIBUTES 102 | INPUT ADDRESS 103 | OUTPUT ATTRIBUTE 104 | OUTPUT ADDRESS 105 | TRANSFER AMOUNT 106 | NUMBER OF TRANSFER COMPLETIONS 107 |
|---|---|---|---|---|---|---|
| 0 | INPUT SECTION 30 TRANSFER RATIO 0.5 | 0x55555555 | MEMORY 1 | MEMORY 1 AREA X | 0×100 | 0×12 |
| 1 | INPUT SECTION 31 TRANSFER RATIO 0.25 | 0xaaaaaaaa | MEMORY 1 | MEMORY 1 AREA X | 0×200 | 0×28 |
| 2 | MEMORY 1 | MEMORY AREA X | OUTPUT SECTION 40 | 0×0 | 0×80 | 0×5 |
| 3 | : | : | : | : | : | : |
| 4 | : | : | : | : | : | : |
| 5 | : | : | : | : | : | : |
| 6 | : | : | : | : | : | : |
| 7 | | | | | | |

DATA CONVERSION PROCESSING APPARATUS

BACKGROUND OF THE INVENTION

1. Field of the Invention

The present invention relates to a data conversion processing apparatus that performs resampling processing of digitally sampled voice and images.

2. Description of the Related Art

Digitally sampled voice and images require various kinds of processing for connection to a speaker and CRT or similar display apparatus respectively. For example, in the case of voice, if the sampling frequency is different for input and output, resampling of the input data is necessary using a low pass filter and linear interpolation, and if it is wished to obtain one output from a plurality of inputs, superimposition of the respective data is also necessary after resampling.

An example of a conventional data conversion processing apparatus is given in Patent Document 1 (Unexamined Japanese Patent Publication No. HEI 8-321745). A conventional data conversion processing apparatus will be described using FIG. 11.

The conventional data conversion processing apparatus shown in FIG. 11 has memory 1, a resampling section 2, a superimposition section 3, and a control section 4.

Resampling section 2 selects one of a plurality of inputs, performs high-frequency component cutting by means of a low pass filter and arithmetic computation using linear interpolation or spline interpolation, and writes the result to memory 1. Filter processing in resampling section 2 is possible for a number of samples of an M/N integral ratio with good frequency characteristics using zero point insertion and thinning-out, but fine adjustment of the number of samples is not possible. Therefore, a filter processing result is converted to an arbitrary number of samples using linear interpolation or spline interpolation. Also, a low pass filter is selected as the filter, and in order to perform distortion-free processing in voice processing and so forth, this is normally limited to a finite impulse response (FIR) and bilaterally symmetrical linear phase type. The above work is executed by time division, and processed data is stored in areas of memory 1 corresponding to the plurality of inputs.

Superimposition section 3 adds and outputs results after a plurality of resamplings stored in memory 1 as being of the same frequency. Superimposition section 3 performs not only addition but also multiplication for gain adjustment of the respective input sequences. These are processed by time division.

Control section 4 performs time division control of resampling section 2 and superimposition section 3 according to the input data. By the above-described means, a plurality of input data are subjected to time division processing and output data is obtained efficiently.

However, a problem with the above-described conventional technology is a lack of flexibility in that control of input and output is fixed, and therefore a plurality of outputs cannot be obtained, and neither can resampling processing be repeated with output data as input data, for example.

For example, two-dimensional—that is, image-processing is possible if one-dimensional processing results are stored and one-dimensional image processing is performed again in the orthogonal component direction, but to do so requires the addition of control enabling use of the data conversion processing apparatus again.

SUMMARY OF THE INVENTION

It is an object of the present invention to provide a data conversion processing apparatus that enables data to undergo resampling processing and be output simply and flexibly.

According to an aspect of the invention, a data conversion processing apparatus that resamples data from an input section and outputs that data to an output section comprises: a resampling section that samples and outputs input data at different frequencies; memory that stores output by the aforementioned resampling section; and a DMA that performs control so that data input from the aforementioned input section is output to the aforementioned resampling section via an input channel and output channel, and also data stored in the aforementioned memory is transferred to the aforementioned output section via an output channel and input channel.

According to an aspect of the invention, in the above-described data conversion processing apparatus, the aforementioned resampling sections and the aforementioned memories are provided as a plurality correspondingly; and the aforementioned DMA connects part of a plurality of input channels to respective outputs of the aforementioned plurality of memories, and connects part of a plurality of output channels to respective inputs of the aforementioned plurality of resampling sections; and performs control so that data from the aforementioned plurality of input sections are output to the aforementioned plurality of resampling sections via a corresponding aforementioned input channel and output channel, and also data stored in the aforementioned plurality of memories are transferred to the aforementioned plurality of output sections via corresponding aforementioned output channel and input channel.

According to another aspect of the invention, in the above-described data conversion processing apparatus, the aforementioned DMA classifies a plurality of input channels into a number of groups and sets corresponding input identification information, and also classifies a plurality of output channels into a number of groups and sets corresponding output identification information; and based on the aforementioned input identification information and output identification information, the aforementioned DMA performs control, based on the aforementioned input identification information and output identification information, so that the data from the aforementioned plurality of input sections are output to the aforementioned plurality of resampling sections via a corresponding aforementioned input channel and output channel, and also data stored in the aforementioned plurality of memories are transferred to the aforementioned plurality of output sections via a corresponding aforementioned output channel and input channel.

BRIEF DESCRIPTION OF THE DRAWINGS

The above and other objects and features of the invention will appear more fully, hereinafter from a consideration of the following description taken in conjunction with the accompanying drawing wherein one example is illustrated by way of example, in which:

FIG. 10 is an explanatory drawing showing an example of parameter settings of a DMA according to Embodiment 4.

DESCRIPTION OF THE PREFERRED EMBODIMENTS

With reference now to the accompanying drawings, embodiments of the present invention will be explained in detail below.

Embodiment 1

Figure 1:
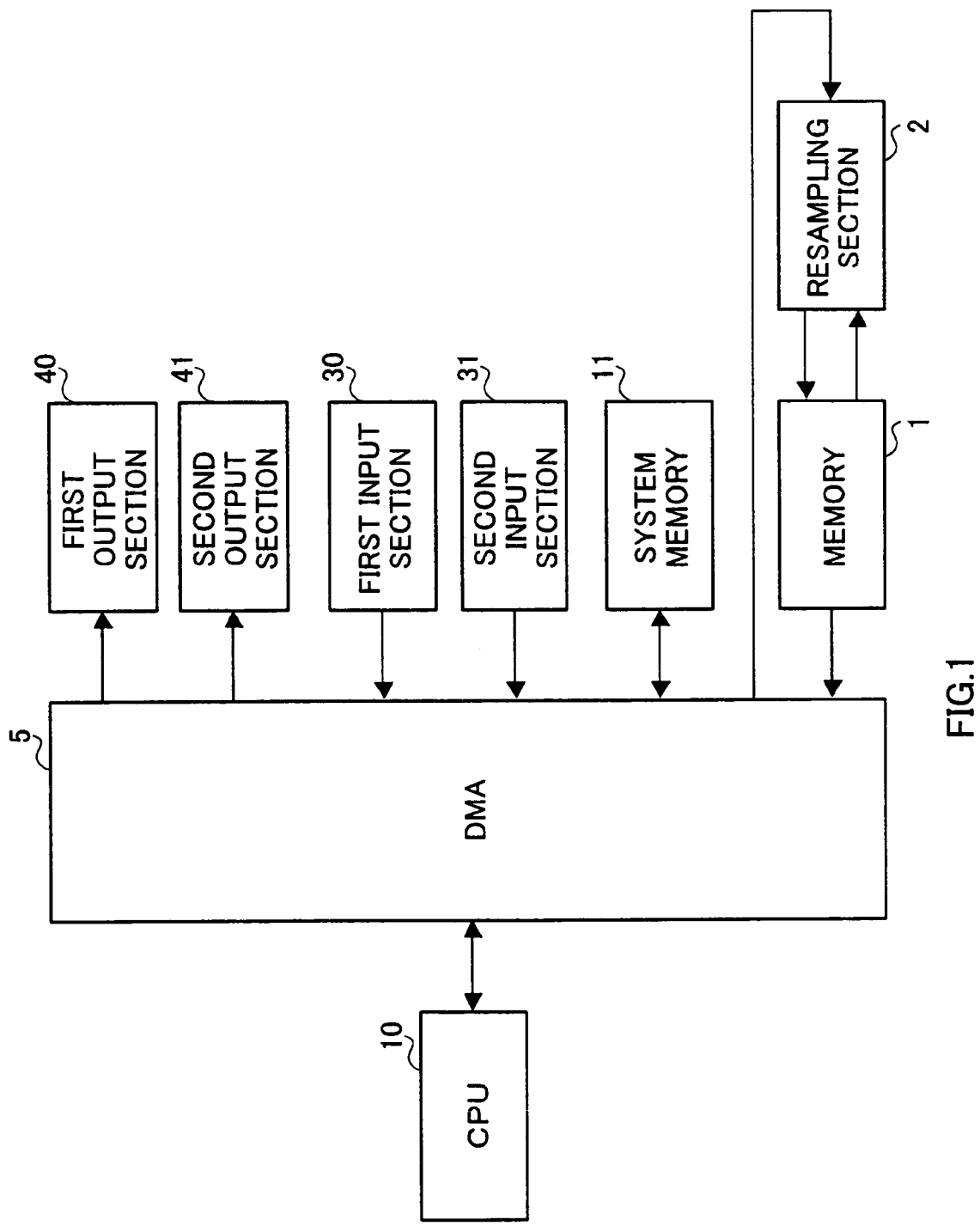
FIG. 1 is a block diagram showing the configuration of a data conversion processing apparatus according to Embodiment 1 of the present invention.

FIG. 1 is a block diagram showing the configuration of a data conversion processing apparatus according to Embodiment 1 of the present invention.

In FIG. 1, a data conversion processing apparatus of Embodiment 1 has memory 1, resampling section 2, DMA 5, CPU 10, system memory 11, first input section 30, second input section 31, first output section 40, and second output section 41. For the sake of explanation, Embodiment 1 is described using first input section 30, second input section 31, first output section 40, and second output section 41, but the number of input sections and output sections is not limited to two each, and one section or a different plurality of sections may of course be used.

DMA 5 has a plurality of input channels and output channels, and memory 1, resampling section 2, CPU 10, system memory 11, first input section 30, second input section 31, first output section 40, and second output section 41 are linked via a plurality of input channels and a plurality of output channels. For each of the plurality of input channels and output channels, DMA 5 has parameters such as input channel information and output channel information including an address for identifying each channel and so forth, and the transfer amount on each channel, and is configured so that these parameters are set by CPU 10 or the like.

DMA 5 performs transfers from input channels specified by these parameters from CPU 10 or the like to output channels, and these can be performed in parallel. The number for which parallelism is possible depends on the number of parameter sets implemented and the transfer system for parallel execution. There are various kinds of parallel transfer, such as limiting the number of physical transfer means and performing execution of each parameter set by time division, or providing physical transfer means for each parameter set. Using parallel transfer enables transfer from first input section 30 to system memory 11 and transfer from system memory 11 to first output section 40 to be executed simultaneously.

Here, resampling section 2 is connected to one or a plurality of DMA 5 input channels. In the case of a plurality, a plurality of resampling sections 2 are provided. The output(s) of one or a plurality of resampling sections 2 is/are connected to memory 1. If there are a plurality of resampling sections 2, the contents of memory 1 are subjected to division management by address. Division management is performed for each resampling section 2 or is performed by transfer destination address, depending on the implementation. Memory 1 output is connected to one DMA 5 input channel. When memory 1 is division managed, distribution is performed in each case to a DMA 5 input channel. A plurality of memories 1 may of course be provided for a plurality of resampling sections 2.

Next, operation will be explained.

When the above-described parameters—that is, input channel information and output identification information including addresses of a plurality of input channels and output channels, transfer amount, and so forth—are set in DMA 5 from CPU 10, DMA 5 starts up and performs data transfer via an input channel and output channel in accordance with the parameters specified by CPU 10.

For example, by means of a parameter setting in DMA 5, transfer can be specified from first input section 30 to resampling section 2 via DMA 5 and an input channel and output channel thereof. Also, by means of another parameter setting, transfer can be specified of the above-described transferred contents from memory 1 storing those contents to first output section 40 via DMA 5 and an input channel and output channel thereof. By means of the DMA transfer specification made by these two parameter settings, transfer from first input section 30 to first output section 40 is performed.

Resampling section 2 generates the result of multiplying one input data by the specified filter impulse response. A response of the desired sample location is calculated using linear interpolation or the like on this, and results are saved and output while being superimposed. The number of superimpositions depends on the number of impulse responses. This series of processing steps is the same as resampling processing using the filter shown in FIG. 2, for example.

Figure 2:
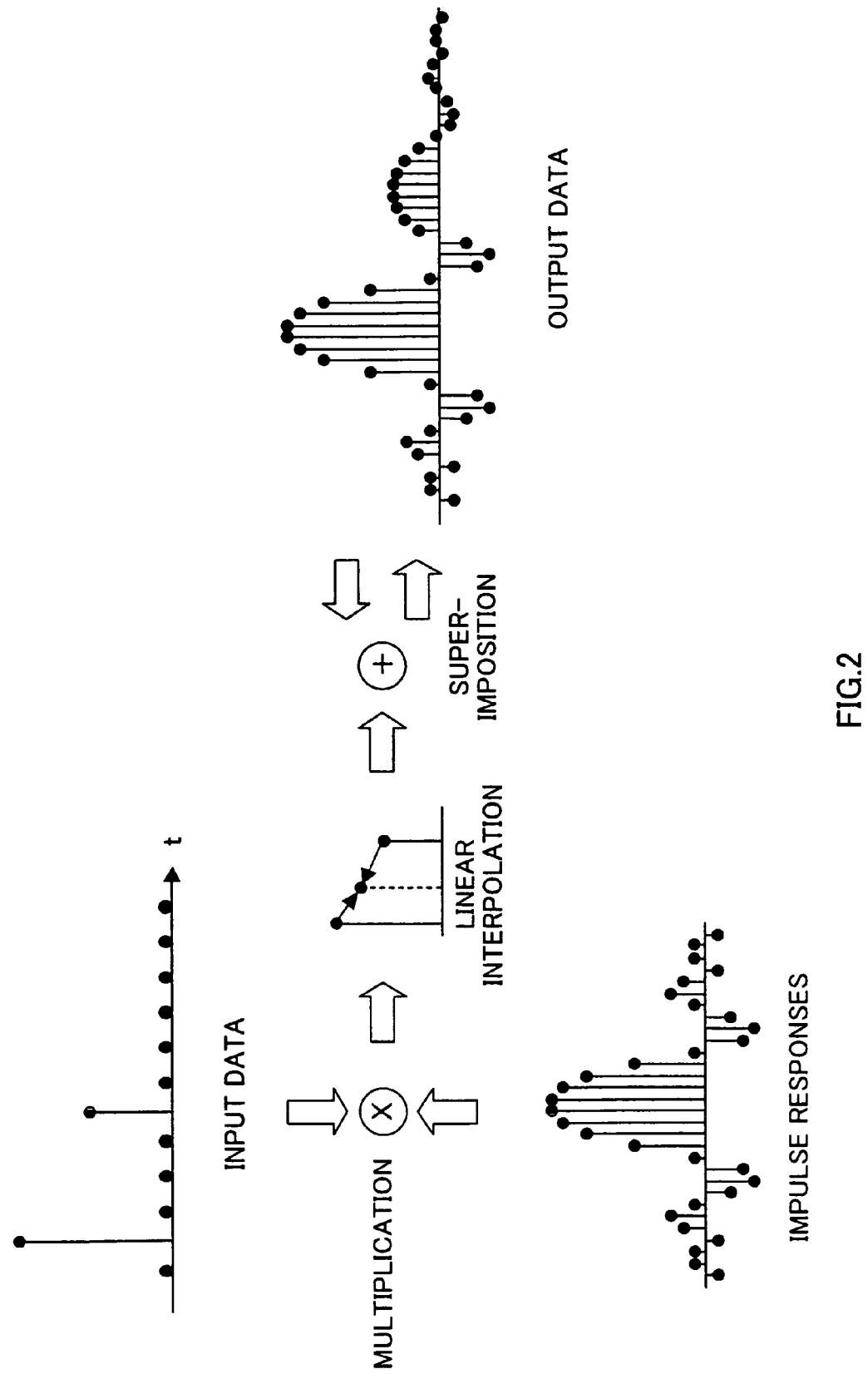
FIG. 2 is a drawing explaining the series of processing steps by a resampling section of Embodiment 1.

FIG. 2 is a drawing explaining the series of processing steps by resampling section 2 of Embodiment 1.

FIG. 2 shows that resampling section 2 of Embodiment 1 multiplies input data by an impulse response, performs linear interpolation of the multiplication results, and superimposes the results of linear interpolation to produce output data.

However, if transfer of the result of resampling section 2 from memory 1 to DMA 5 is performed when calculation of the result to be stored in memory 1 has not yet been completed, an incorrect result will be output to first output section 40. Therefore, a flag indicating to what extent the result from resampling section 2 has been completed in memory 1 is input from memory 1 to DMA 5, and transfer from DMA 5 to first output section 40 is suppressed.

Also, if the capacity of memory 1 is limited, a ring buffer structure is used for memory 1. In this case, in addition to the above-described flag indicating to what extent the result from resampling section 2 has been completed, a flag indicating how much space there is in memory 1 is input from memory 1 to resampling section 2, and output from resampling section 2 to memory 1 is suppressed.

Furthermore, as there is a possibility of data to be input from DMA 5 to resampling section 2 piling up, it is necessary for a flag that suppresses input from resampling section 2 to be input to DMA 5.

Accordingly, a transfer control flag that is a handshaking flag that suppresses mutual data transfer is necessary between apparatuses DMA 5, memory 1, and resampling section 2. Thus, the relationship between apparatuses DMA 5, memory 1, and resampling section 2 of Embodiment 1 is, for example, the pipeline control relationship shown in FIG. 3.

Figure 3:
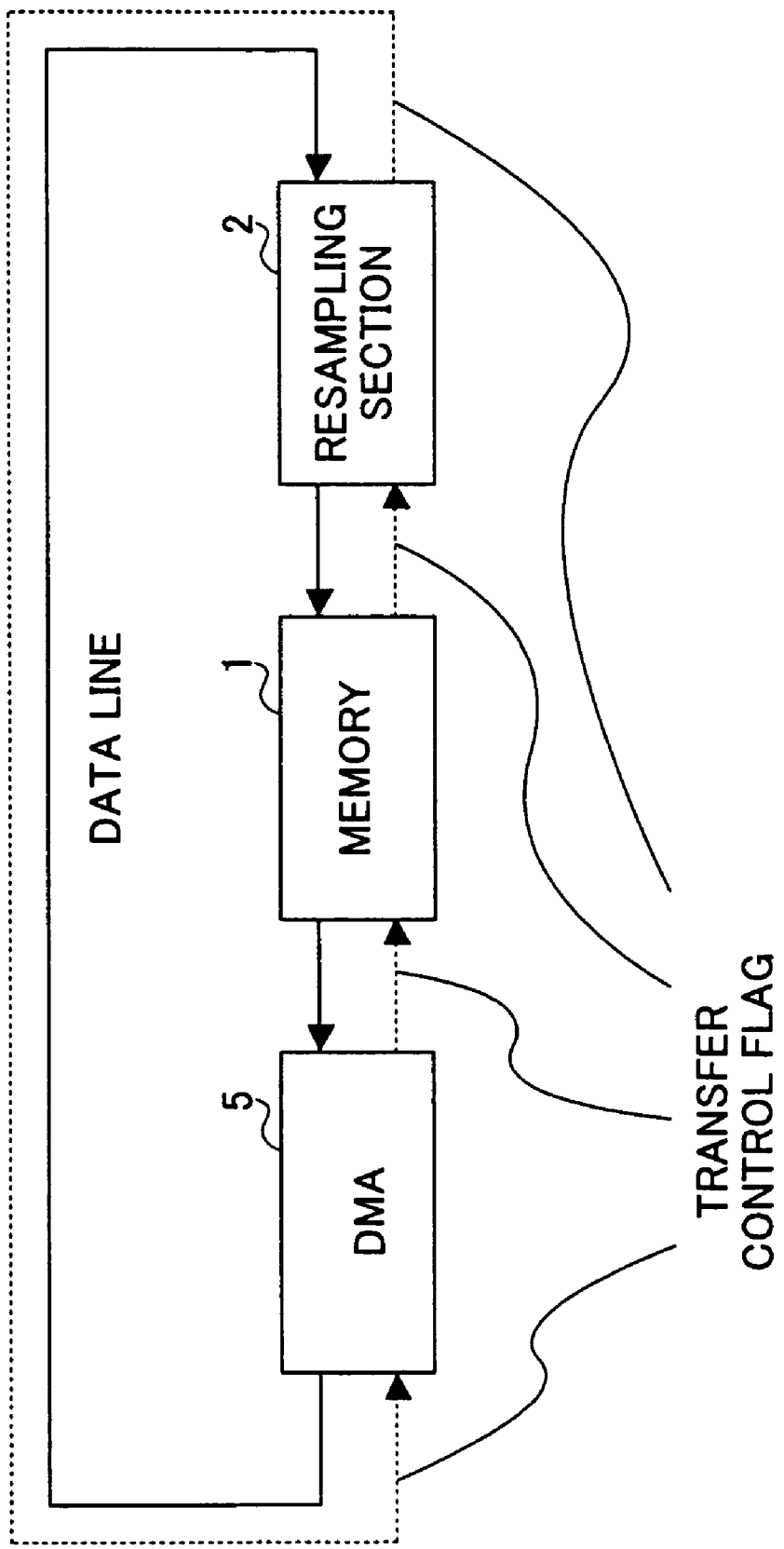
FIG. 3 is a drawing showing the relationship between apparatuses DMA, memory, and resampling section of Embodiment 1.

FIG. 3 is a drawing showing the relationship between apparatuses DMA 5, memory 1, and resampling section 2 of Embodiment 1.

As shown in FIG. 3, in Embodiment 1, a transfer control flag that is a handshaking flag that suppresses transfer is transferred in the DMA 5, memory 1, resampling section 2, DMA 5, memory 1, . . . direction, while data is transferred in the opposite direction—that is, the resampling section 2, memory 1, DMA 5, resampling section 2, memory 1, . . . direction.

As described above, in a data conversion processing apparatus of Embodiment 1, CPU 10 sets parameters such as input channel information and output identification information including addresses of a plurality of input channels and output channels, transfer amount, and so forth in DMA 5, and controls data transfer from plurality of input sections 30 and 31 to plurality of output sections 40 and 41 via DMA 5 and a plurality of input channels and output channels thereof, making it possible to control input and output between memory 1, resampling section 2, plurality of input sections 30 and 31, and plurality of output sections 40 and 41, simply by the general-purpose means that is DMA 5.

If a plurality of input channels and output channels are used in DMA 5 and the total number of inputs and total number of outputs are managed simultaneously, transfer may be suppressed through determination by DMA 5 itself instead of using a transfer control flag that suppresses data transfer—that is, without a transfer control flag.

In the description of Embodiment 1, a data conversion processing apparatus has been described that has one resampling section 2, and one memory 1 corresponding to that resampling section 2, but the present invention is not limited to this, and a data conversion processing apparatus may instead be configured with the provision of a plurality of resampling sections 2 and a plurality of memories 1 corresponding to that plurality of resampling sections 2, and with part of the input channels of DMA 5 connected to respective outputs of the plurality of memories 1, and part of the output channels of DMA 5 connected to respective inputs of the plurality of resampling sections 2.

Embodiment 2

Whereas a data conversion processing apparatus of Embodiment 1 was an apparatus that can process one input and provide one output, a data conversion processing apparatus of Embodiment 2 will now be described that can process a plurality of inputs and produce one output.

Figure 4:
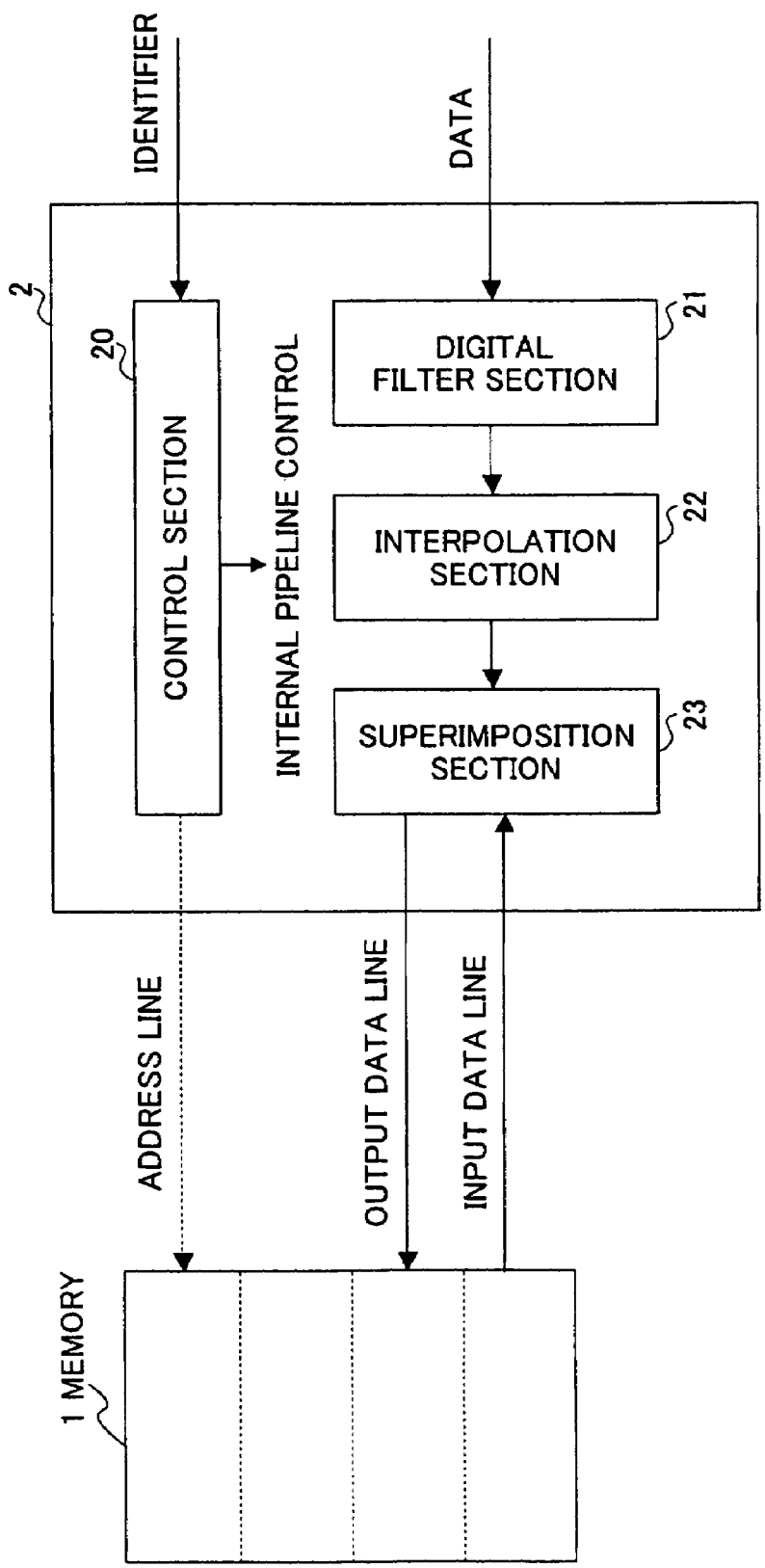
FIG. 4 is a block diagram showing the configuration of a resampling section of a data conversion processing apparatus of Embodiment 2.

FIG. 4 is a block diagram showing the configuration of a resampling section of a data conversion processing apparatus of Embodiment 2.

In FIG. 4, resampling section 2 of a data conversion processing apparatus of Embodiment 2 has control section 20, digital filter section 21, interpolation section 22, and superimposition section 23. Apart from resampling section 2, the configuration is the same as that of the data conversion processing apparatus of Embodiment 1 shown in FIG. 1.

Operation will now be explained. Here, the description will focus on operation of resampling section 2 of the data conversion processing apparatus unique to Embodiment 2.

Superimposition section 23 performs addition of a data sequence prior to writing to memory 1 and a data sequence calculated by interpolation section 22, and writes the result to memory 1. As a result, superimposition of an impulse response sequence generated by digital filter section 21 and interpolation section 22 and a sequence stored in memory 1 is executed. When there is nothing stored in memory 1, superimposition is not performed and only writing to memory 1 is executed.

Control section 20 selects an impulse response set based on a set sampling ratio and the number of input data, and this is used in filter operations and sampling processing by digital filter section 21 and interpolation section 22. For impulse response selection, it is desirable to select an impulse response that performs attenuation or amplification of a specific frequency band. Control section 20 may of course select an impulse response and sampling ratio based on output identification information of each output channel from DMA 5.

DMA 5 adds an identifier as a parameter attached to an address or data for each input and output. Identifiers have input identification information and output identification information for determining a data sequence. That is to say, input identification information is set with a plurality of input channels classified into a number of group—that is, data sequences—by means of a directive from CPU 10 or an external source for each processing operation, and output identification information is set with a plurality of output channels classified into a number of groups—that is, data sequences—by CPU 10 for each processing operation, and therefore input identification information and output identification information correspond to each processing step, a directive from an external source, or the like.

For example, control section 20 determines an input data sequence using input identification information of an above-described identifier attached to an address or data from DMA 5. When transfer from first input section 30 and transfer from second input section 31 are performed, for example, input identification information for identifying both sources is attached, and therefore control section 20 can determine which source the input data sequence came from—that is to say, in this case, first input section 30 or second input section 31. According to this determination, saving of temporary information of internal pipeline processing in resampling section 2, filter coefficient switching, or the like is performed.

Control section 20 also performs output data sequence determination using output identification information, and generates an address to be written to in memory 1. For example, if the same output identification information is given in a transfer from first input section 30 and a transfer from second input section 31, this is regarded as output of the same sequence, and as a result, superimposition is performed for both samples.

Furthermore, by providing versatility for memory 1 management using output identification information, it is possible to create a different plurality of data sequences, or to create a mixture of a plurality of data sequences in one data sequence.

For example, when audio data is output, it is necessary to create left and right (LR) with different data sequences at the same timing. In this case, it is only necessary for information indicating that left and right (LR) should be created at the same timing to be incorporated as output identification information, and for control section 29 to perform address generation based on this information so that in consecutive addresses the L side is assigned to an even address and the R side to an odd address. In this way, a sequence can be created in which LR audio data is mixed alternately.

Figure 5:
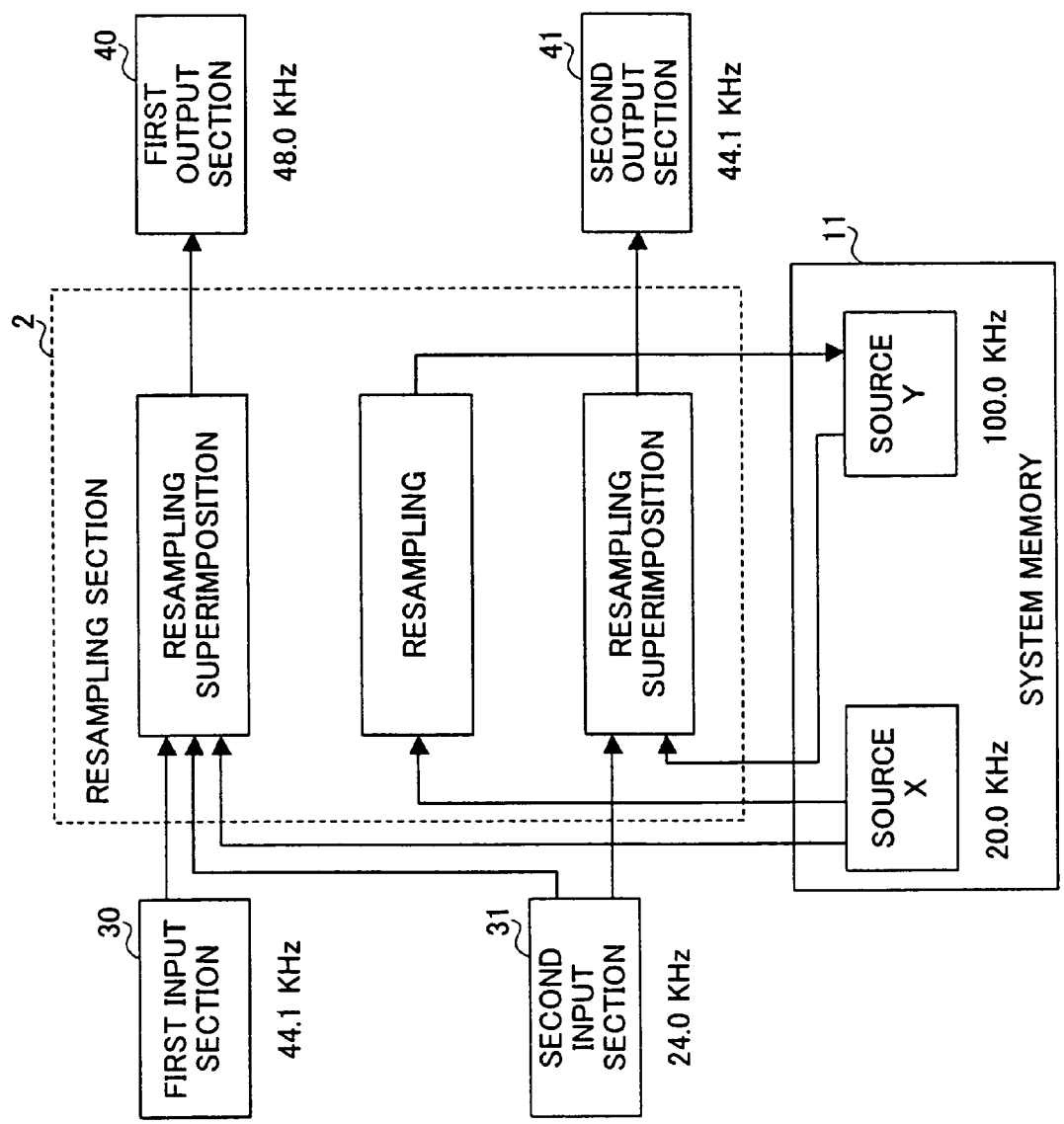
FIG. 5 is a drawing showing an example of internal processing and so forth in a resampling section according to Embodiment 2.

FIG. 5 is a drawing showing an example of internal processing and so forth in resampling section 2 when conversion and output is performed simultaneously from 44.1 kHz voice data from first input section 30, 24.0 kHz music data from second input section 31, and a 20.0 kHz source X held in system memory 11, to 48.0 kHz first output section 40 and 44.1 kHz second output section 41.

The resampling processing in FIG. 5 is achieved by digital filter section 21 and interpolation section 22 inside resampling section 2 in FIG. 4, and the resampling superimposition processing in FIG. 5 is achieved by digital filter section 21, interpolation section 22, and superimposition section 23 inside resampling section 2 in FIG. 4.

To be specific, in the case shown in FIG. 5, by means of a DMA 5 setting, first input section 30, second input section 31, and source X in system memory 11 become a sequence that has undergone sampling and superimposition at the same frequency—that is, the to 48.0 kHz of first output section 40—by resampling section 2 via DMA 5 and an input channel and output channel thereof, and is output to first output section 40 at 48.0 kHz.

On the other hand, 20.0 kHz source X in system memory 11 is sampled as a 100 kHz data sequence by resampling section 2 via DMA 5, first converted and stored as 100 kHz source Y in system memory 11, and again, together with 24.0 music data of second input section 31 forms a sequence that has undergone sampling and super imposition at 44.1 kHz, and is output to second output section 41 at 44.1 kHz.

As described above, according to Embodiment 2, resampling section 2 is composed of digital filter section 21, interpolation section 22, and superimposition section 23, and by means of a DMA 5 setting, voice data, music data, or such like input data of a particular frequency is resampled as data of a different frequency by resampling section 2 via DMA 5 and an input channel and output channel thereof, and data of a plurality of different frequencies are sampled and superimposed so as to become output data of one frequency, making possible flexible data conversion processing, and enabling a plurality of inputs to be processed and made into one output.

Furthermore, if fixed attenuation is performed using input identification information in any of digital filter section 21, interpolation section 22, or superimposition section 23, combining is possible for each source at the desired volume.

Embodiment 3

In Embodiment 3, details of resampling section 2 will be described using FIG. 6 through FIG. 9.

Embodiment 3 is characterized by the fact that digital filter section 21 of resampling section 2 performs resampling processing while eliminating or deleting aliasing caused by resampling processing. The configuration of resampling section 2 of Embodiment 3 is the same as that of resampling section 2 of Embodiment 2 shown in FIG. 4, and therefore the details of resampling section 2 of Embodiment 3 will be described with reference to FIG. 4.

Figure 6A:
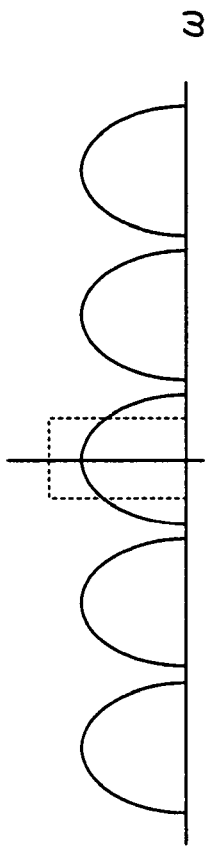
FIGS. 6(a), 6(b) and 6(c) are drawings showing generation of aliasing eliminated or deleted by a resampling section according to Embodiment 3 at the time of resampling processing.
Figure 6B:
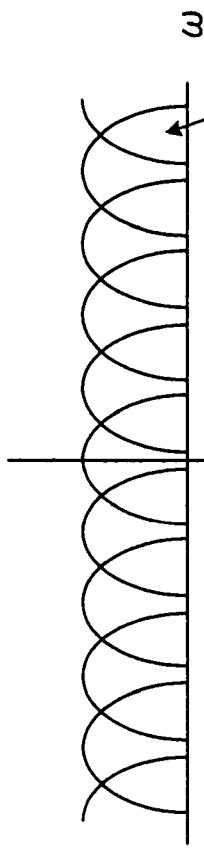

If, for example, the original frequency components are assumed to be as in FIG. 6(a), simply changing the sampling point will result in FIG. 6(b). In this case, as shown in FIG. 6(b), frequency component overlapping occurs, and distortion called aliasing is created in the overlapping parts.

Figure 6C:
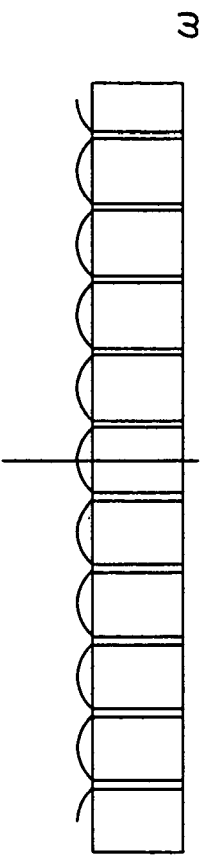

FIG. 6(c) shows a case where the sampling point is changed after using a low pass filter as resampling section 2 of Embodiment 3. In this case, as shown in FIG. 6(c) distortion due to aliasing is greatly reduced since parts in which overlapping occurs are attenuated by the low pass filter. That is to say, by presetting an impulse response that is a low pass type of frequency response and performing superimposition calculation with an input sequence, output is obtained, but frequency characteristics—that is, the amount of attenuation and transition time—are improved by the large number of impulse responses.

Here, combining the filter characteristics that specify the amount of attenuation of each band for the low pass filter also makes band control of that data possible at the same time. This processing is generally referred to as an equalizer function, and simply requires an impulse response multiplied by the above-mentioned filter characteristics to be calculated beforehand.

By adopting a method in resampling section 2 whereby the number of inputs is interpolated by an integer multiple (designated M) and thinned out by an integer multiple (designated N), data sampled at an M/N multiple can be obtained. Here, M and N are natural numbers.

That is to say, in order to obtain data sampled at an M/N multiple, digital filter section 21 of resampling section 2 inserts (M-1) zero points between input samples, superimposes filter impulse responses, and thins out N at a time from the result. However, since it is known that superimposition calculation of parts for which zero point insertion is performed gives a result of 0, and also calculation need not be performed for points that are thinned out, in actuality a result is obtained by superimposing impulse responses derived by means of M above with a different phase with respect to the input sequence.

It is necessary for the number of impulse responses to be decided beforehand by having this stored by control section 20 of resampling section 2 or the like, or being provided from an external source. For example, in the case of Embodiment 3, it is necessary to prepare (impulse response length×M) data, but if M is a large number, implementation of the apparatus will not be practicable. Therefore, in the generality of cases, M, and by association N, are limited. As stated in Embodiment 2, impulse response switching is performed by means of input identification information of an identifier added to input data.

Here, a method of implementing digital filter section 21 for which M and N are fixed using a DDA (Digital Differential Analyzer) algorithm is described. The principle of a DDA algorithm will first be explained using FIG. 7 and FIG. 8.

Figure 7:
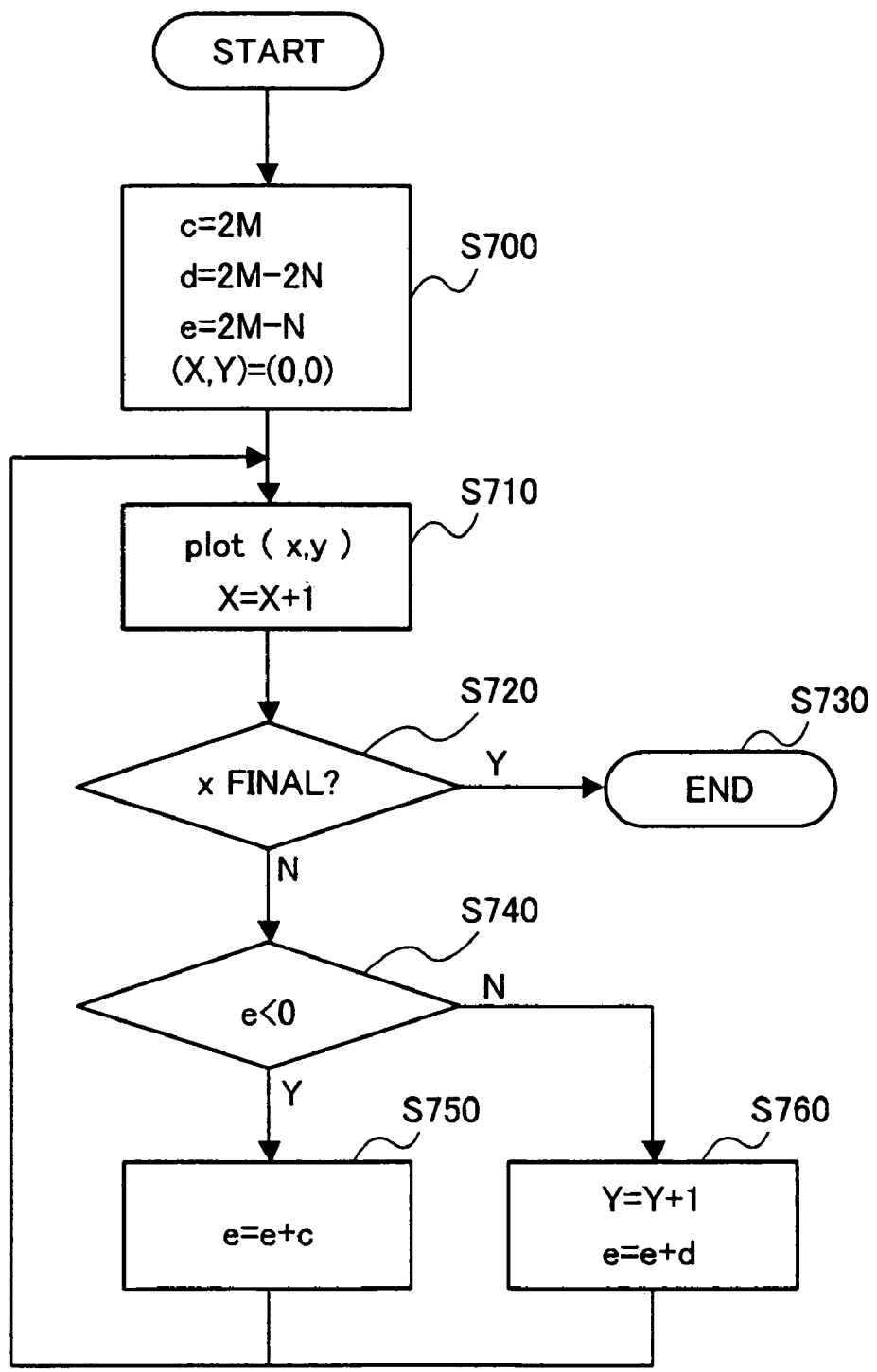
FIG. 7 is a flowchart showing an example of a DDA algorithm used by a resampling section of Embodiment 3.

FIG. 7 is a flowchart showing an example of a DDA algorithm used in Embodiment 3.

M and N—that is, multiple M when performing interpolation of the number of inputs for resampling using an M/N multiple and multiple N when thinning out—are given, and assuming that N>M, whether or not output data is output each time input data is input, and the phase of that output data, can be calculated using the DDA algorithm flowchart shown in FIG. 7.

Whether or not output data is output each time input data is input indicates the sampling frequency in resampling section 2, and the output data phase indicates a parameter for selection of a filter coefficient that adjusts distortion due to aliasing and so forth.

Here, the number of input data is taken as the X-axis and the number of output data as the Y-axis, and e is called the error variable.

First, as initial values, settings of c=2M, d=2M−2N, error variable e=2M−N, and (X,Y)=(0,0) are made (S700).

Next, point (X,Y) is plotted on a plane with the number of input data as the X-axis and the number of output data as the Y-axis, and X is incremented by 1—that is, the operation X=X+1 is executed (S710).

Next, it is determined whether or not X is final (S720). If X is final (S720 "Y"), this DDA algorithm is terminated (S730), whereas if X is not final (S720 "N"), it is then determined whether or not e<0—that is, whether or not error variable e is less than 0 (S740).

If error variable e is less than 0 (S740 "Y"), e=e+c—that is, error variable e is incremented by c (S750)—and the flow returns to the processing that plots point (X,Y) and increments X by 1 in above-described step 710. On the other hand, if error variable e greater than or equal to 0 (S740 "N"), Y=Y+1 and e=e+d—that is, Y is incremented by 1 and error variable e is incremented by d (S760)—and the flow returns to the processing in above-described step 710.

Through the processing by the DDA algorithm described above, when N>M, if N is taken as the X-axis and M is taken as the Y-axis, the value of Y may not be updated even when the value of X is updated, and therefore it can be determined whether or not output data Y is output each time input data X is input, and by this means resampling can be performed using an M/N multiple.

Next, the phase of output, which is a parameter for selection of a filter coefficient that adjusts distortion due to aliasing and so forth, will be explained using FIG. 8.

Figure 8:
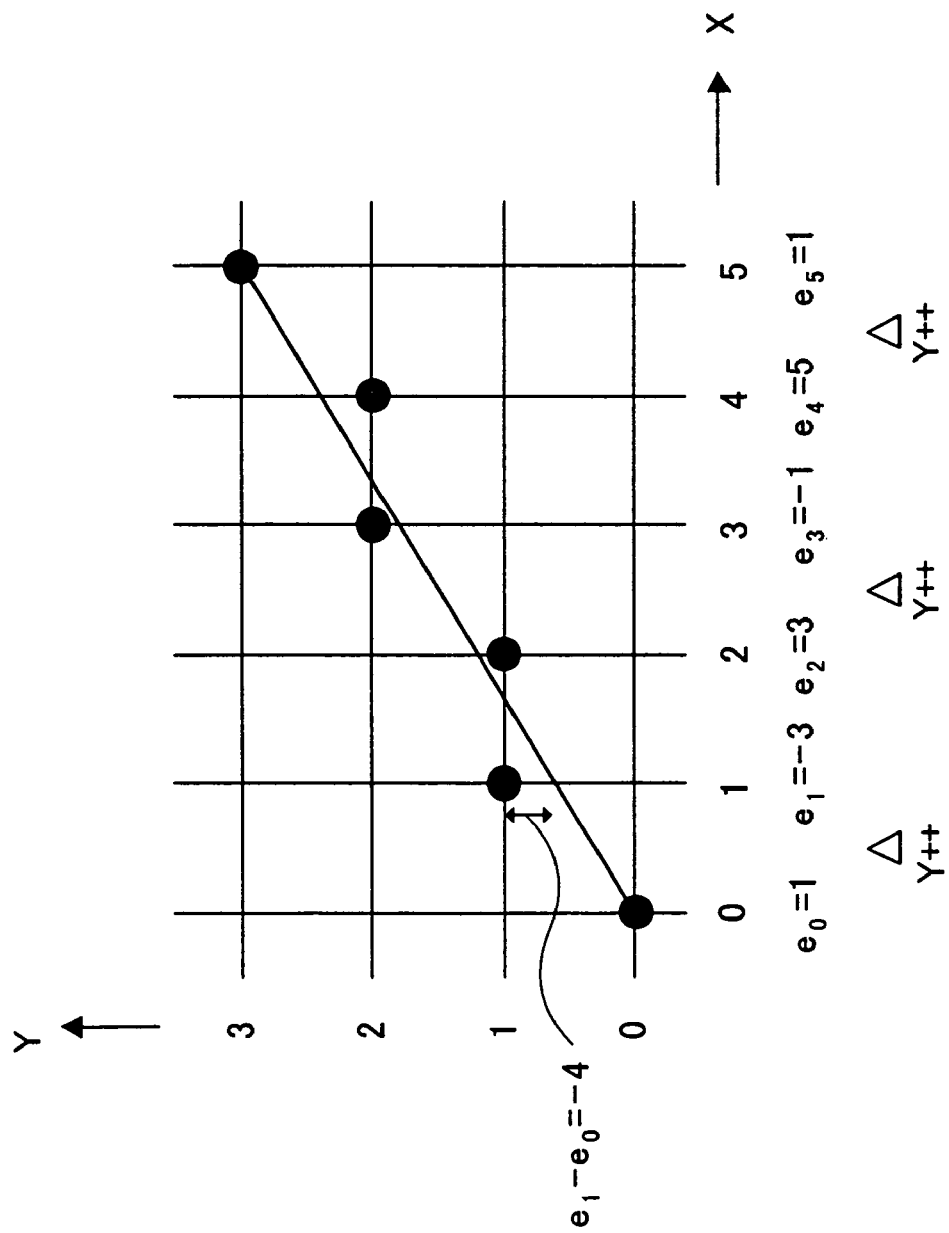
FIG. 8 is a drawing showing the X-axis, Y-axis, and error variable e variation according to a DDA algorithm used by a resampling section of Embodiment 3.

FIG. 8 is a drawing showing the X-axis, Y-axis, and error variable e variation when N=5 and M=3.

In FIG. 8, N is shown on the X-axis, M is shown on the Y-axis, a line segment is found by means of the DDA algorithm shown in FIG. 7, and error variable e is found. By checking the Y-axis direction variable each time a variable is basically changed in the X-axis direction, it is seen whether or not output is performed for input. Also, the phase of that output Y can be identified by subtracting initial value $e_0$ of error variable e from error variable e $(e-e_0)$.

Specifically, in FIG. 8, when X=0 error variable $e_0$=1, when X=1 error variable $e_1$=−3, when X=2 error variable $e_2$=3, when X=3 error variable $e_3$=−1, ..., and the phase when output Y=1 can be identified by subtracting initial value $e_0$ of error variable e from error variable e1 $(e_1-e_0)$ =−4. That is to say, when Y=1, the filter coefficient for adjusting distortion due to aliasing is selected in accordance with the output phase difference $(e_1-e_0)$=−4.

In FIG. 8, "ΔY++" represents ΔY=ΔY+1, and indicates that Y is incremented at that X update timing.

Since this method uses only integer operations, as can be seen from FIG. 7, cumulative rounding error and so forth does not occur. Thus elimination of aliasing and such like distortion, and broad M/N resampling, are possible with digital filter section 21.

Next, interpolation section 22 of resampling section 2 performs resampling exceeding the ranges of above-described M and N of digital filter section 21.

Interpolation section 22 may be assumed to perform linear interpolation, for example, and the resampling method using linear interpolation will be explained. In the case of linear interpolation, assuming that resampling section 2 performs resampling at P/Q overall, digital filter section 21 performs resampling at M/N, and therefore a (P·N)/(Q·M) multiple must be used by interpolation section 22 in order for the output from resampling section 2 to be ultimately made P/Q. P and Q are both natural numbers, as are M and N.

Figure 9A:
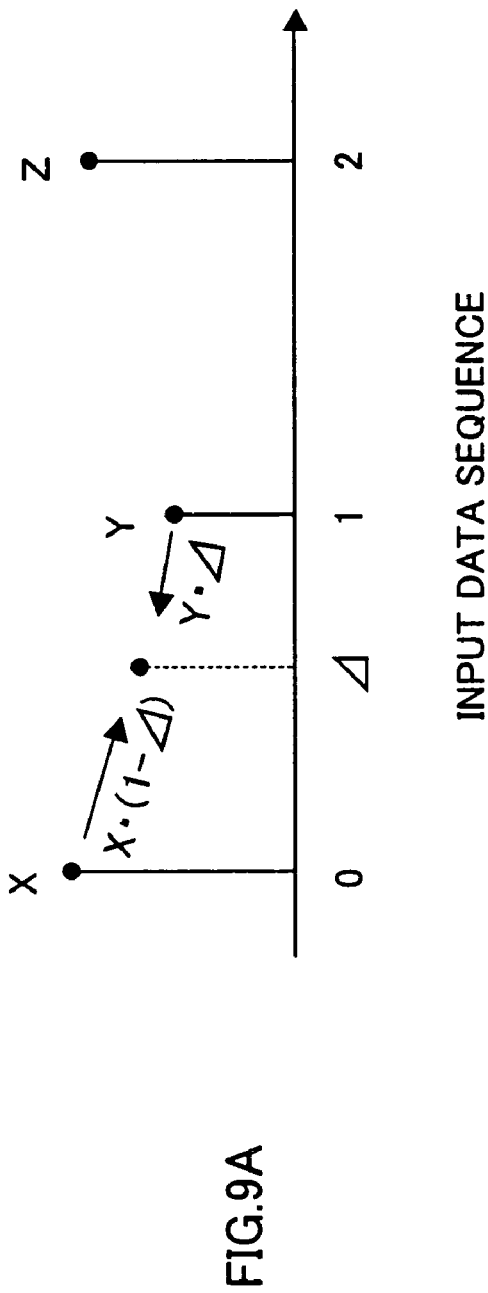
FIGS. 9(a) and 9(b) are drawings showing an input data sequence and output data sequence using linear interpolation in a resampling section of Embodiment 3.

FIG. 9(a) is a drawing showing an input data sequence of resampling section 2, and shows a case in which resampling is performed at the Δ output location.

Figure 9B:
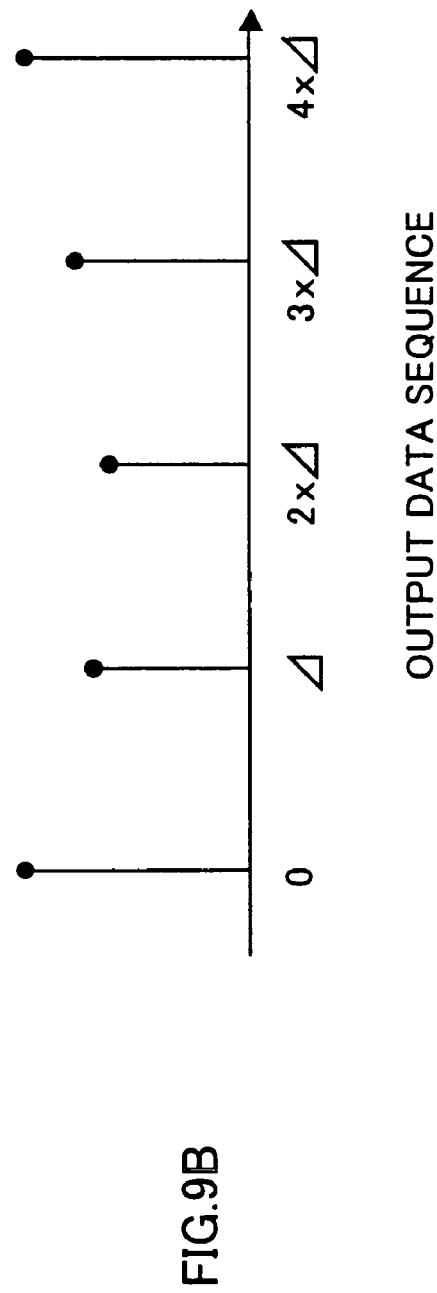
Figure 11:
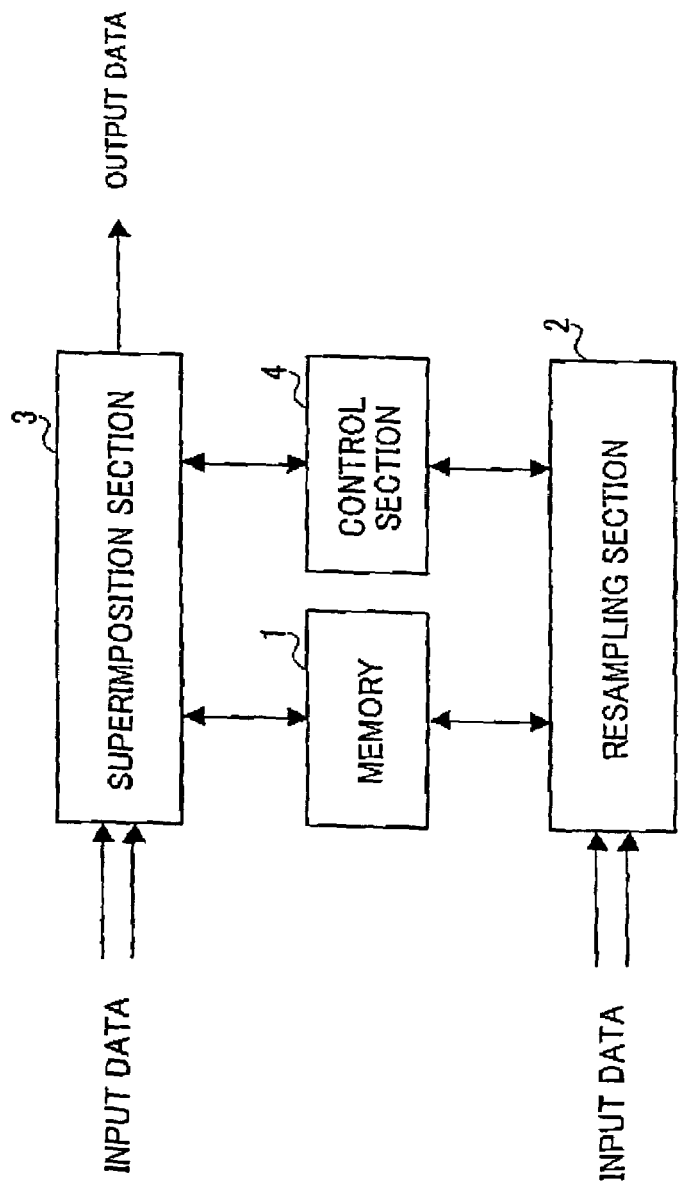
FIG. 11 is an explanatory drawing of a conventional data conversion processing apparatus.

That is to say, if the location of Δ is known, the output sample value can be calculated using the input sample values either side of it and a calculated weight. By repeating this calculation, the output data sequence Δ, 2×Δ, 3×Δ, 4×Δ, ... is obtained, as shown in FIG. 9(b).

Regarding Δ, a calculation method using the DDA algorithm shown in FIG. 7 is complicated, and therefore a method is used in which an output step corresponding to input X is expressed in fixed-point or floating-point notation, and is subjected to consecutive addition.

Here, since the number of samples of interpolation section 22 is (P·N)/(Q·M), the output step corresponding to interpolation section 22 input is (Q·M)/(P·N). For the sake of explanation, Δ is assumed to be the same as this output step, and to be 1.0 or less, but in actuality, Δ is replaced by the distance between the input sample location and enclosed output sample location in a system in which additions are performed one at a time using a normalized—that is integer—number.

In this way, interpolation section 22 can perform resampling of the correct location.

As well as linear interpolation, the interpolation method used by interpolation section 22 may be spline interpolation using 4 nearby points, or a method using digital filter section 21 in a cascaded configuration. If digital filter section 21 is used in a cascaded configuration, only resampling in which M and N are prime factors is performed.

As described above, according to Embodiment 3, resampling section 2 uses a DDA (Digital Differential Analyzer) algorithm in order to interpolate the number of inputs using an integral multiple (designated M) and perform resampling using M/N with thinning out executed using an integral multiple (designated N), enabling M/N to be found easily and digital filter section 21 in which M and N are defined to be implemented easily.

Embodiment 4

With Embodiment 4 also, overall control is basically performed by DMA 5 parameter setting and a transfer control flag that is a handshaking flag between apparatuses memory 1, resampling section 2, and DMA 5, but when time information is attached to such data as satellite broadcast, and deviation occurs between that time and terminal time, it is necessary for the resampling interval to be adjusted. In Embodiments 1 through 3, parameters necessary for resampling have been fixed and static, but in Embodiment 4 an embodiment in which parameters are changed dynamically will be described using FIG. 10.

First, instead of a method whereby the sampling ratio of resampling section 2 is determined beforehand and is switched by means of above-described input identification information, a method is shown whereby a sampling ratio is switched in accordance with a parameter set in DMA 5 by means of above-described input identification information.

FIG. 10 shows an example of parameter settings of DMA 5 according to Embodiment 4.

In FIG. 10, parameters set in DMA 5 according to Embodiment 4 include, for example, logical channel (CH)

101 of parameter with a range of 0 to 7, input attributes 102 showing the input section or memory that is the input source, and the transfer ratio, input address 103, output attribute 104 showing output section or memory that is the output destination, output address 105, transfer amount 106, and number of transfer completions 107. The transfer ratio (resampling ratio) of input attributes 102, in particular, is a parameter that effects conversion. These parameters are attached as identifiers to data transferred by DMA 5.

In FIG. 10, No. 0 items for logical channel (CH) 101 show transfer performed by resampling section 2 from first input section 30 to area X of memory 1 using a 0.5 transfer ratio—that is, taking half the number of samples—with the fact that transfer of 0×12 bytes has currently finished indicated by number of transfer completions 107.

In FIG. 10, also, No. 1 items for logical channel (CH) 101 show transfer performed by resampling section 2 from second input section 31 to area X of memory 1 using a 0.25 transfer ratio—that is, taking ¼ of the number of samples—with the fact that transfer of 0×28 bytes has currently finished indicated by number of transfer completions 107. As the same area X of memory 1 is specified by output address 105 in both cases, overlapping storage is performed.

In FIG. 10, also, No. 2 items for logical channel (CH) 101 show transfer performed directly from memory 1 storing the above transfer results to first output section 40, with the fact that transfer of 0×5 bytes has currently finished indicated by number of transfer completions 107.

Thus, in Embodiment 4, the number of resamplings is not set beforehand in resampling section 2, but instead a transfer ratio (resampling ratio) for which an arbitrary value can be set as one of input attributes 102 is attached as an input attribute 102 to input data transferred to resampling section 2 by DMA 5, making it possible to change the transfer ratio (resampling ratio) dynamically.

There is of course no problem if, instead of using a transfer ratio (resampling ratio), it is made possible to split transfer amount 106, for example, into an input transfer amount and output transfer amount, and both the input transfer amount and output transfer amount are set in an identifier and provided as an integral ratio.

Furthermore, a transfer ratio (resampling ratio) may of course be set using number of transfer completions 107 instead of transfer amount 106.

A method of finely adjusting a transfer ratio (resampling ratio) from number of transfer completions 107 will now be described.

Although a transfer ratio (resampling ratio) set in input attributes 102 is fixed, when samples entering first input section 30 are provided from an external source an accurate transfer ratio may not be obtained due to variations of the external clock and internal clock. For example, with logical channel (CH) 101, there is a possibility of deviation of cumulative error for both No. 0 and No. 1 transfers. Thus, number of transfer completions 107 is normalized.

That is to say, in the above example, multiplication is performed by 0.5 giving 0×9 when logical channel (CH) 101 is No. 0, and multiplication is performed by 0.25 giving 0×a when logical channel (CH) 101 is No. 1. This variation can be absorbed by applying feedback control to the transfer ratio output as an identifier so that the difference can be kept constant.

Here, for example, since transfer is more advanced for No. 0 logical channel (CH) 101, the transfer ratio of input attributes 102 could be changed to 0.49 from 0.5. To consider the change value of the transfer ratio (resampling ratio) of input attributes 102, this can easily be calculated by sampling number of transfer completions 107 at fixed time intervals in DMA 5 and checking fluctuation with respect to time.

If the difference of normalized number of transfer completions 107 is 4 at time A and 5 at time B, the external clock is determined to have fluctuated by a proportion of (5−4)/(B−A), and one or other transfer ratio is adjusted by that proportion.

As described above, according to Embodiment 4, by not setting the number of resamplings in resampling section 2 beforehand using a DMA 5 parameter, but instead, for example, attaching a transfer ratio (resampling ratio) set arbitrarily as one of input attributes 102 to input data transferred to resampling section 2 by DMA 5, it becomes possible to change the transfer ratio (resampling ratio) dynamically, and to perform dynamic adjustment of resampling and superimposition of various data sequences.

Instead of using a transfer ratio (resampling ratio) it may of course also be made possible to split transfer amount 106, for example, into an input transfer amount and output transfer amount, and for both the input transfer amount and output transfer amount to be set in an identifier and provided as an integral ratio, and furthermore, number of transfer completions 107 may of course be used instead of transfer amount 106, number of transfer completions 107 normalized, and a transfer ratio (resampling ratio) changed dynamically.

As described above, according to the present invention, flexible and multifunctional resampling processing is possible using the general-purpose setting method of DMA setting.

That is to say, a data conversion processing apparatus of the present invention is a data conversion processing apparatus that resamples data from an input section and outputs that data to an output section, and employs a configuration that has: a resampling section that samples and outputs input data at different frequencies; memory that stores data output by the aforementioned resampling section; and a DMA that performs control so that data input from the aforementioned input section is output to the aforementioned resampling section via an input channel and output channel, and also data stored in the aforementioned memory is transferred to the aforementioned output section via an output channel and input channel.

In particular, in the aforementioned data conversion processing apparatus, a configuration is employed whereby a plurality of the aforementioned resampling sections and the aforementioned memories are provided correspondingly; and the aforementioned DMA connects part of a plurality of input channels to respective outputs of the aforementioned plurality of memories, and connects part of a plurality of output channels to respective inputs of the aforementioned plurality of resampling sections; and performs control so that data from the aforementioned plurality of input sections are output to the aforementioned plurality of resampling sections via a corresponding aforementioned input channel and output channel, and also data stored in the aforementioned plurality of memories are transferred to the aforementioned plurality of output sections via a corresponding aforementioned output channel and input channel.

Also, in the aforementioned data conversion processing apparatus, a configuration is employed whereby the aforementioned DMA classifies a plurality of input channels into a number of groups and sets corresponding input identification information, and also classifies a plurality of output channels into a number of groups and sets corresponding output identification information; and based on the aforementioned input identification information and output identification information, the aforementioned DMA performs control so that data from the aforementioned plurality of input sections are output to the aforementioned plurality of resampling sections via a corresponding aforementioned input channel and output channel, and also data stored in the aforementioned plurality of memories are transferred to the aforementioned plurality of output sections via a corresponding aforementioned output channel and input channel.

Also, in the aforementioned, data conversion processing apparatus, a configuration is employed whereby the aforementioned resampling section performs sampling processing of data from the aforementioned plurality of inputs changing the sampling processing based on control of the aforementioned DMA, and also outputs that resampling result to the aforementioned plurality of output sections via the aforementioned DMA.

Also, in the aforementioned data conversion processing apparatus, a configuration is employed whereby the aforementioned resampling section performs sampling processing of data from the aforementioned plurality of inputs changing the sampling processing in accordance with the aforementioned input identification information and output identification information based on control of the aforementioned DMA, and also outputs that resampling result to the aforementioned plurality of output sections via the aforementioned DMA.

Also, in the aforementioned data conversion processing apparatus, a configuration is employed whereby the aforementioned resampling section performs superimposition and addition after performing sampling processing of data from the aforementioned plurality of inputs.

Also, in the aforementioned data conversion processing apparatus, a configuration is employed whereby the aforementioned memory has a ring buffer structure, and when there is no room in the aforementioned memory, the aforementioned resampling section suspends corresponding processing, and when there is no margin for processing in the aforementioned resampling section, the aforementioned DMA suspends transfer to the corresponding aforementioned resampling section.

Also, in the aforementioned data conversion processing apparatus, a configuration is employed whereby the aforementioned resampling section is composed of a control section, a digital filter section that performs filter processing, and an interpolation section that is connected in cascaded fashion to the aforementioned filter section; wherein the aforementioned control section selects an impulse response set based on a set sampling ratio and the number of input data, and is used in filter computation and sampling processing by the aforementioned digital filter section and the aforementioned interpolation section.

Also, in the aforementioned data conversion processing apparatus, a configuration is employed whereby the aforementioned control section selects an impulse response that performs attenuation or amplification of a specific frequency band.

Also, in the aforementioned data conversion processing apparatus, a configuration is employed whereby the aforementioned control section selects the aforementioned impulse response and the aforementioned sampling ratio based on output identification information of each output channel from the aforementioned DMA.

Also, in the aforementioned data conversion processing apparatus, a configuration is employed whereby the aforementioned control section selects the aforementioned impulse response and the aforementioned sampling ratio based on a transfer amount specified by the aforementioned DMA for each input channel and each output channel.

Also, in the aforementioned data conversion processing apparatus, a configuration is employed whereby the aforementioned control section selects the aforementioned impulse response and the aforementioned sampling ratio based on the difference between the number of transfer completions by the aforementioned DMA and the scheduled number of transfers or the number of transfer completions of another channel.

Also, in the aforementioned data conversion processing apparatus, a configuration is employed whereby, when the aforementioned resampling section sets output data as a P/Q multiple of input data by means of resampling processing (where P and Q are natural numbers), the aforementioned control section performs control for the aforementioned digital filter section so that the sampling ratio filter processing is performed with the sampling ratio made to approximate the M/N integral ratio (where M and N are natural numbers), and also performs control for the aforementioned interpolation section so that output that has undergone filter processing by the aforementioned digital filter section is output multiplied by (P·N/Q·M) by means of calculation interpolation processing.

Also, in the aforementioned data conversion processing apparatus, a configuration is employed whereby the aforementioned digital filter section finds whether or not output data is output each time input data is input by means of a DDA (Digital Differential Analyzer) algorithm and calculates a sampling ratio approximating the M/N integral ratio, and also extracts an error variable and calculates the phase of output data which is the difference between each error variable and its initial value, and performs sampling processing using a sampling ratio approximating the M/N integral ratio while eliminating distortion due to aliasing by performing filter processing on the calculated aforementioned sampling ratio and aforementioned output data phase.

Therefore, a data conversion processing apparatus of the present invention achieves the advantageous effect of making possible flexible and multifunctional resampling processing using the general-purpose setting method of DMA setting, and is useful for a device that uses audio processing and/or image processing that resamples data such as voice data and/or image data from an input section and outputs that data to an output section.

The present invention is not limited to the above-described embodiments, and various variations and modifications may be possible without departing from the scope of the present invention.

This application is based on Japanese Patent Application No. 2005-083874 filed on Mar. 23, 2005, the entire content of which is expressly incorporated by reference herein.

What is claimed is:

1. A data conversion processing apparatus that resamples data from an input section and outputs that data to an output section, said data conversion processing apparatus comprising:
   a resampling section that samples and outputs input data at different frequencies;
   a memory that stores data output by said resampling section; and
   a direct memory access unit that performs control so that data input from said input section is output to said resampling section via an input channel and output channel, and also data stored in said memory is transferred to said output section via an output channel and input channel, wherein:

said resampling section and said memory are provided as a plurality correspondingly; and said direct memory access unit connects part of a plurality of input channels to respective outputs of said plurality of memories, connects part of a plurality of output channels to respective inputs of said plurality of resampling sections and performs control so that data from said plurality of input sections are output to said plurality of resampling sections via corresponding said input channel and output channel, and data stored in said plurality of memories are transferred to said plurality of output sections via corresponding said output channel and input channel.

2. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said direct memory access unit classifies a plurality of input channels into a number of groups and sets corresponding input identification information, and also classifies a plurality of output channels into a number of groups and sets corresponding output identification information; and said direct memory access unit, based on said input identification information and output identification information, performs control so that data from said plurality of input sections are output to said plurality of resampling sections via corresponding said input channel and output channel, and also data stored in said plurality of memories are transferred to said plurality of output sections via corresponding said output channel and input channel.

3. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section performs sampling processing of data from said plurality of inputs changing sampling processing based on control of said direct memory access unit, and also outputs that resampling result to said plurality of output sections via said direct memory access unit.

4. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section performs sampling processing of data from said plurality of inputs changing sampling processing in accordance with said input identification information and output identification information based on control of said direct memory access unit, and also outputs that resampling result to said plurality of output sections via said direct memory access unit.

5. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section performs superimposition and addition after performing sampling processing of data from said plurality of inputs.

6. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said memory has a ring buffer structure;

said resampling section suspends corresponding processing when there is no room in said memory; and said direct memory access unit suspends transfer to corresponding said resampling section when there is no margin for processing in said resampling section.

7. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section comprises:

a control section;

a digital filter section that performs filter processing; and an interpolation section that is connected in cascaded fashion to said filter section;

wherein said control section selects an impulse response set based on a set sampling ratio and a number of input data, and is used in filter computation and sampling processing by said digital filter section and said interpolation section.

8. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section includes a control section that selects an impulse response that performs attenuation or amplification of a specific frequency band.

9. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section includes a control section that selects said impulse response and said sampling ratio based on output identification information of each output channel from said direct memory access unit.

10. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section includes a control section that selects said impulse response and said sampling ratio based on a transfer amount specified by said direct memory access unit for each input channel and each output channel.

11. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein:

said resampling section includes a control section that selects said impulse response and said sampling ratio based on a difference between a number of transfer completions by said direct memory access unit and a scheduled number of transfers or a number of transfer completions of another channel.

12. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein said resampling section comprises:

a control section;

a digital filter section that performs filter processing; and an interpolation section that is connected in cascaded fashion to said filter section; and wherein, when said resampling section sets output data as a P/Q multiple of input data by means of resampling processing (where P and Q are natural numbers), said control section performs control for said digital filter section so that sampling ratio filter processing is performed with a sampling ratio made to approximate an M/N integral ratio (where M and N are natural numbers), and also performs control for said interpolation section so that output that has undergone filter processing by said digital filter section is output multiplied by (P·N/Q·M) by means of calculation interpolation processing.

13. A data conversion processing apparatus that resamples data from an input section and outputs that data to an output section, said data conversion processing apparatus comprising:

a resampling section that samples and outputs input data at different frequencies;

a memory that stores data output by said resampling section; and a direct memory access unit that performs control so that data input from said input section is output to said resampling section via an input channel and output channel, and also data stored in said memory is transferred to said output section via an output channel and input channel, wherein said resampling section comprises:

a control section; and a digital filter section that performs filter processing, wherein:

said digital filter section finds whether or not output data is output each time input data is input by means of a DDA (Digital Differential Analyzer) algorithm and calculates a sampling ratio approximating an M/N integral ratio, and also extracts an error variable and calculates a phase of output data which is a difference between each error variable and its initial value, and performs sampling processing using a sampling ratio approximating an M/N integral ratio while eliminating distortion due to aliasing by performing filter processing on calculated said sampling ratio and said output data phase.

* * * * *